(12) United States Patent
Nakamata et al.

(10) Patent No.: US 6,979,176 B2
(45) Date of Patent: Dec. 27, 2005

(54) COOLED TURBINE COMPONENT AND COOLED TURBINE BLADE

(75) Inventors: Chiyuki Nakamata, Sayama (JP); Yoji Okita, Tokorozawa (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 71 days.

(21) Appl. No.: 10/813,397

(22) Filed: Mar. 31, 2004

(65) Prior Publication Data

US 2005/0135931 A1    Jun. 23, 2005

(30) Foreign Application Priority Data

Dec. 19, 2003    (JP) ............................. 2003-423406

(51) Int. Cl.⁷ ............................................... F01D 5/18

(52) U.S. Cl. .................................................. 416/97 R

(58) Field of Search ........................ 416/97 R; 415/115

(56) References Cited

U.S. PATENT DOCUMENTS

| | | | |
|---|---|---|---|
| 4,197,443 A | * | 4/1980 | Sidenstick ............... 219/69.15 |
| 4,303,374 A | | 12/1981 | Braddy |
| 4,664,597 A | | 5/1987 | Auxier et al. |
| 4,672,727 A | | 6/1987 | Field |
| 4,676,719 A | | 6/1987 | Auxier et al. |
| 4,684,323 A | * | 8/1987 | Field .......................... 416/97 R |
| 5,660,525 A | | 8/1997 | Lee et al. |

FOREIGN PATENT DOCUMENTS

JP    2002-221005    8/2002

* cited by examiner

Primary Examiner—Ninh H. Nguyen
(74) Attorney, Agent, or Firm—Oblon, Spivak, McClelland, Maier & Neustadt, P.C.

(57) ABSTRACT

A cooled turbine rotor blade comprises a blade body having a cooling passage so that cooling air is introduced, and a film cooling hole which is formed on the surface of the blade body and includes an inlet opening and a wedge shaped spurt out opening. The film cooling hole is divided into at least two openings by a partition wall on the outlet side of the film cooling hole.

6 Claims, 3 Drawing Sheets

COOLED TURBINE COMPONENT AND COOLED TURBINE BLADE

CROSS REFERENCE TO RELATED APPLICATIONS

This application is based upon and claims the benefit of priority from the prior Japanese Patent Application No. P2003-423406, filed on Dec. 19, 2003; the entire contents of which are incorporated herein by reference.

BACKGROUND OF THE INVENTION

1. Field of the Invention

This present invention relates to turbine components equipped in gas turbine engines for aircraft, more particularly, to turbine components equipped in cooled turbine blades cooled with a film cooling.

2. Description of the Related Art

A conventional cooled turbine blade as a cooling turbine component in a gas turbine engine will be described below.

A conventional cooled turbine blade comprises a blade body (a main body), and inside the blade body it includes a cooling passage. Compressed air is fed from a compressor or a fan, and this air provides cooling air to the cooling passage.

Film cooling holes are provided on the surface of the blade body by an electric discharging or laser machining. Each film cooling hole is connected to the cooling passage. The film cooling holes further include an inlet opening which introduces the cooling air and is provided on an inlet profile of the blade body and a wedge shaped spurt out opening which spurts out the cooling air and is provided on an outlet profile of the blade body. Furthermore, each film cooling hole is inclined to a thickness direction of the blade body, so that the cooling air coats the blade body profile.

Accordingly, when the gas turbine engine is operating, the compressed air is bled from the compressor or the fan, and some of the compressed air (the cooling air) is introduced to the cooling passage. The cooling air is introduced to the inlet opening and spurted from the spurt out opening, thereby forming a cooling film which covers and protects the blade profile. According to the structure mentioned above, the cooled turbine blade is cooled with a film cooling as well as a convection cooling which cools the inside of the blade.

Meanwhile, an invention that is described in Japanese Patent Application Laid-Open No. 2002-221005 shows one of the conventional art.

Heretofore, the conventional cooling hole is formed in the diffuser which is shaped in such that the outlet side is expanded in an expansion angle, so that the cooling air uniformly coats the blade profile. With the angle of the spurt out opening set sizably, the number of the film cooling holes necessary for coating the blade body profile can be reduced. In this case, however, since the amount of cooling air which is fed from the fan or the compressor is constant, the current velocity of the cooling air at the spurt out opening becomes extremely slow, the separation phenomenon occurs, and the cooling performance of the cooled turbine blade is also reduced. In addressing these problems, conventionally to obtain a desired cooling performance, a lot of film cooling holes are provided in the blade profile instead of making the expansion angle larger. In this case, however, longer manufacturing time is needed for making the cooled turbine blade, and the production costs are increased as well. Additionally, as the amount of cooling air necessary for a desired cooling performance is increased, the engine efficiency of the gas turbine engine is lowered.

SUMMARY OF THE INVENTION

To address foregoing problems, according to the first aspect of the present invention, there is provided a cooled turbine component for film cooling in a gas turbine engine comprising: a main body; a film cooling hole which is formed in the main body, and the hole further includes an inlet opening which is provided on an inlet side surface of the main body and an spurt out opening which is provided on an outlet side surface of the main body, and compressed air which is bled from a compressor or a fan introduces to the cooling hole from the inlet opening for providing cooling air, and the cooling air spurt out from the spurt out opening, and the cooling hole is slanted to the thickness direction of the component body so that the cooling air form a cooling film which coats and protects the surface of the main body; and a partition wall which is provided on the bottom surface of the outlet side of the film cooling hole, and the partition wall is extended from the outlet side of the cooling hole to the inlet side of the cooling hole being viewed from the side opposing to the spurt out opening.

According to the second aspect of the present invention, there is provided a cooled turbine blade for film cooling in a gas turbine engine comprising: a blade body including a cooling passage which is provided inside the blade body, and some part of compressed air which is bled from a compressor or a fan equipped with the gas turbine engine is flowed in the passage; a film cooling hole which is provided on the surface of the blade body to communicate with the cooling passage, and the film cooling has an inlet opening which is formed on the inlet side of the blade body and at least one pair of wedge shaped spurt out opening which are formed on the outlet side of the blade body, the cooling air passes to the outlet opening from the inlet opening, and the hole is slanted to the thickness direction of the blade body so that the cooling air uniformly flows across the surface of the blade body; and a partition wall which is provided on the outlet side of a bottom wall of the film cooling hole, and the wall is extended to the inlet side from the outlet side of the blade body being viewed from the side opposite to the spurt out opening.

DETAILED DESCRIPTION OF THE INVENTION

With reference to FIGS. 1 to 5, an embodiment of the present invention will be described below.

Figure 4:
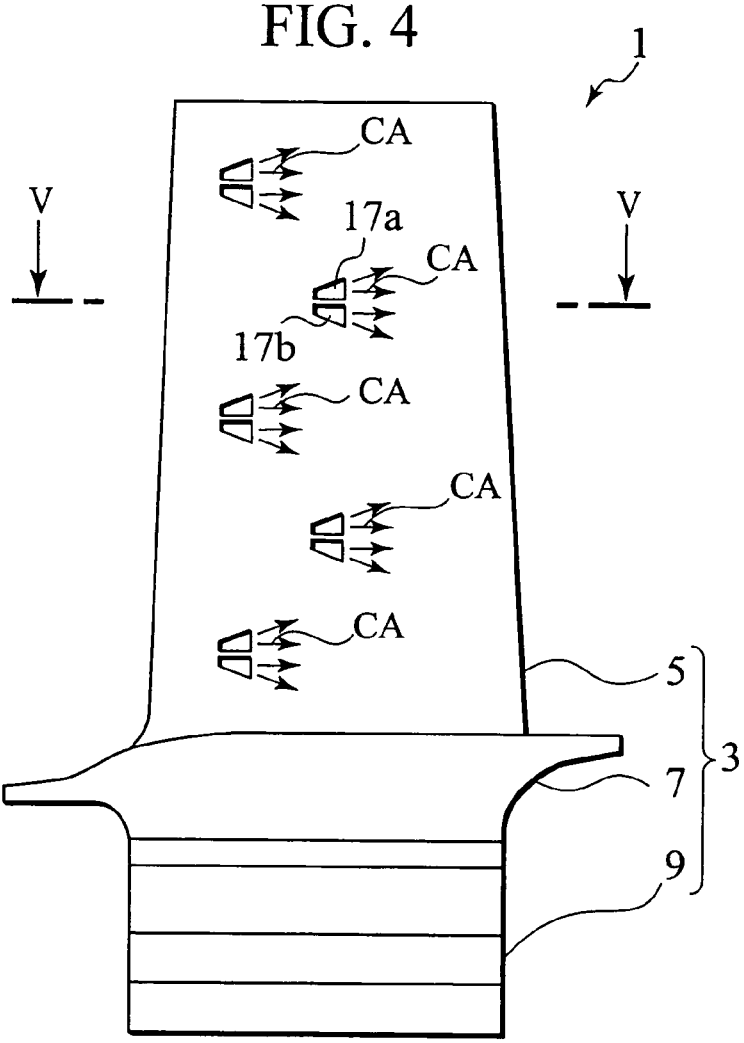
FIG. 4 is a view illustrating a cooling turbine rotor blade of the present invention.
Figure 5:
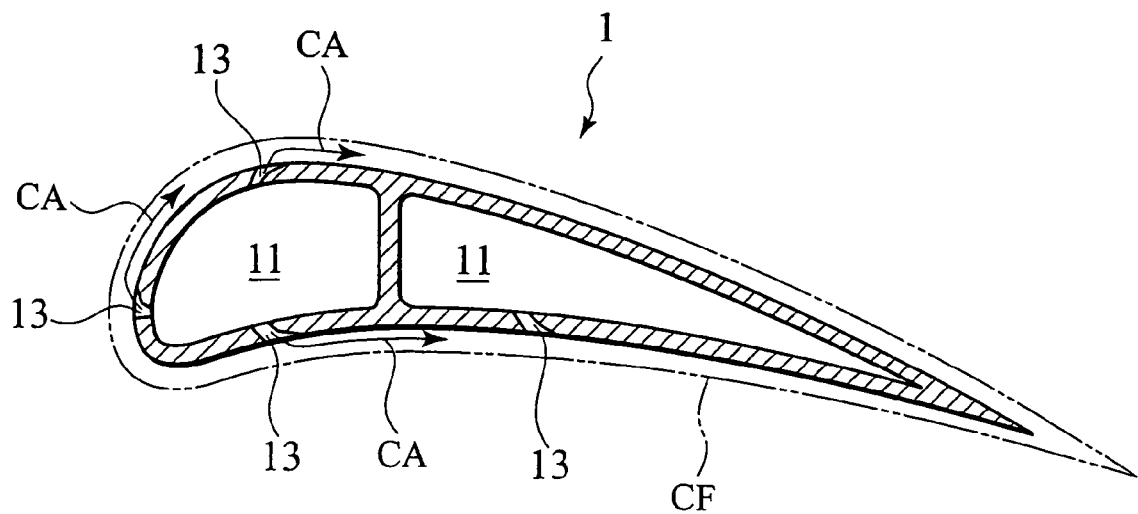
FIG. 5 is a cross-sectional view along with the line V—V of FIG. 4.

As shown in FIGS. 4 to 5, a cooling turbine rotor blade 1 according to an embodiment of the present invention is a component for constituting a gas turbine engine (not shown) equipped in an aircraft.

The cooling turbine rotor blade 1 includes a blade body 3. The blade body 3 further includes an alar part 5 which is rotated by combustion gas from a combustion chamber (not shown) equipped with the gas turbine engine, and a plat home 7 which is provided on one end of the alar part 5, and a dovetail 9 which is integrally provided with the plat home 7 for engaging with a dovetail groove (not shown) of a turbine disk (not shown) of the turbine. Furthermore, a cooling passage 11 is provided inside the blade body 3, so that some of the compressed air which is bled from a compressor (not shown) or fan (not shown) of the gas turbine engine, passes through the cooling passage 11 thereby providing cooling air CA to a film cooling hole 13.

Figure 1:
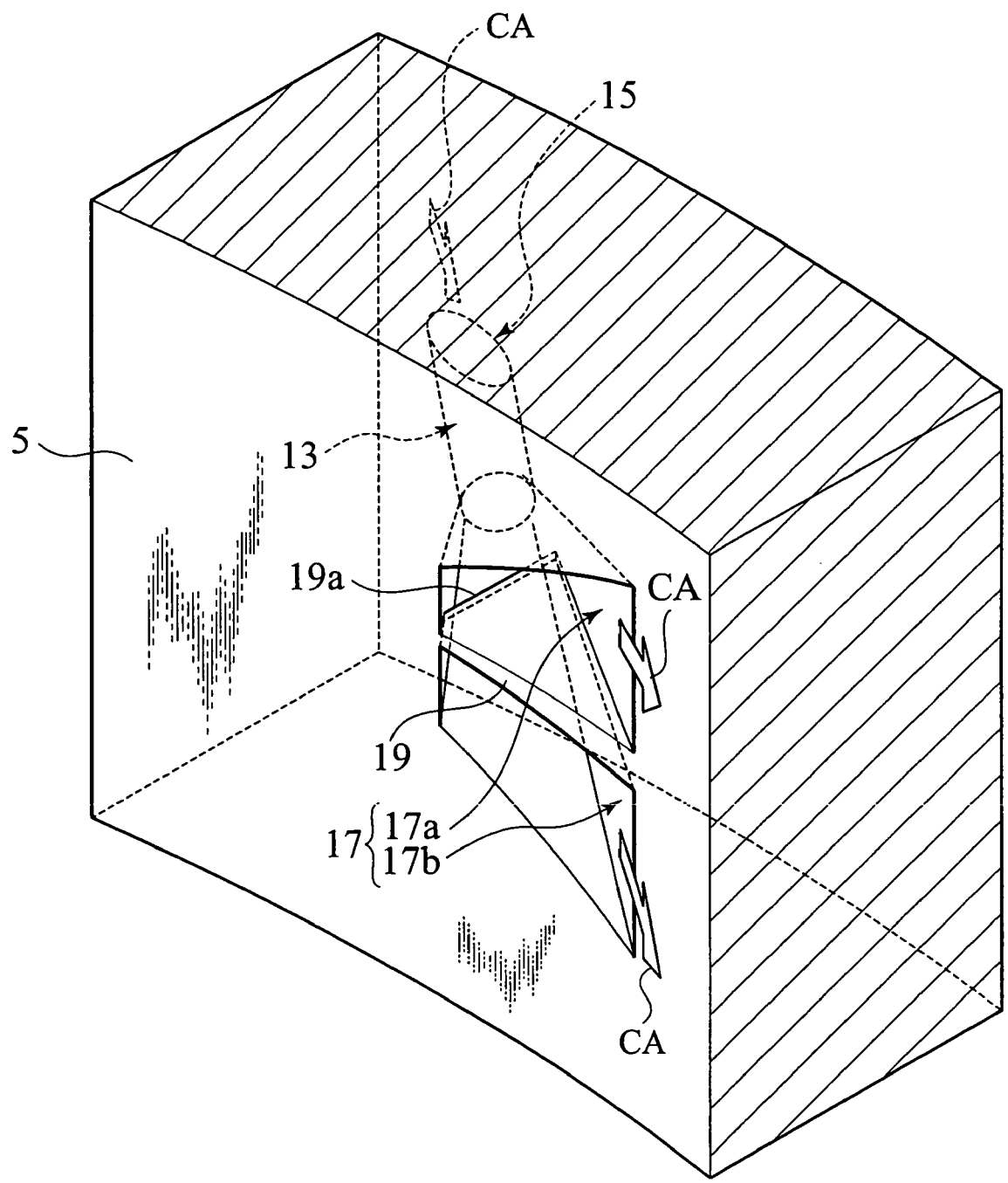
FIG. 1 is a perspective view illustrating an embodiment of the present invention.
Figure 2:
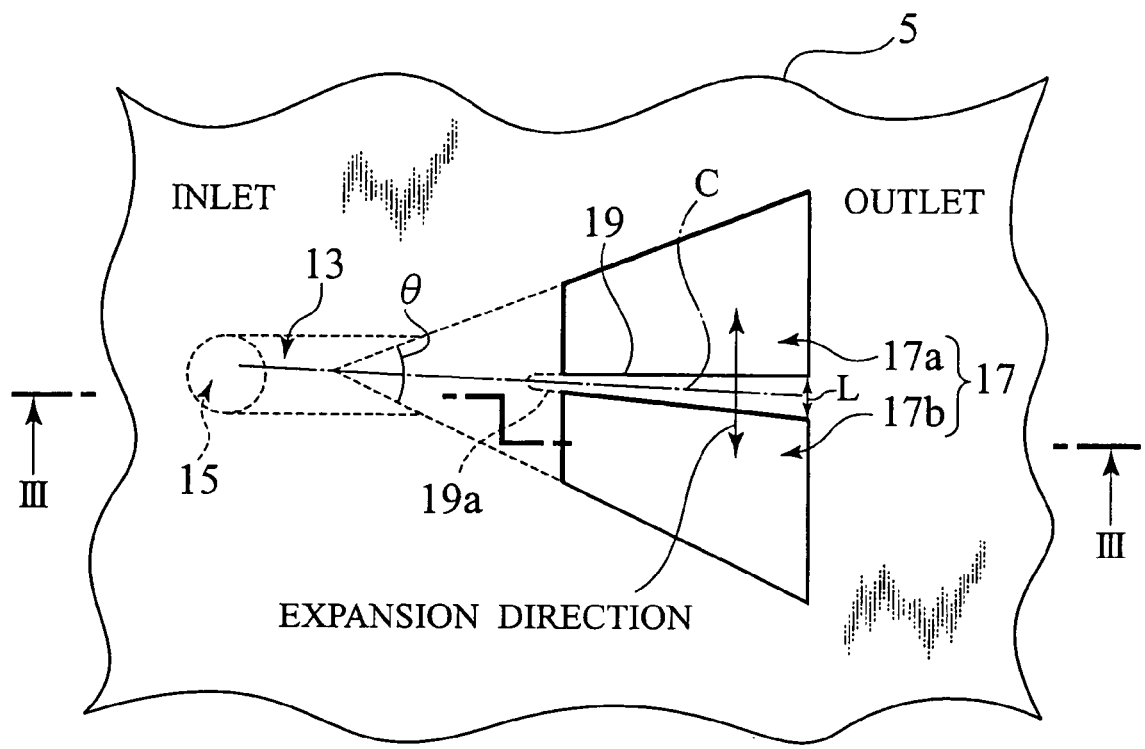
FIG. 2 is an explanation view viewed from the side opposite to the spurt out opening and illustrating a structure of the film cooling hole of the present invention.
Figure 3:
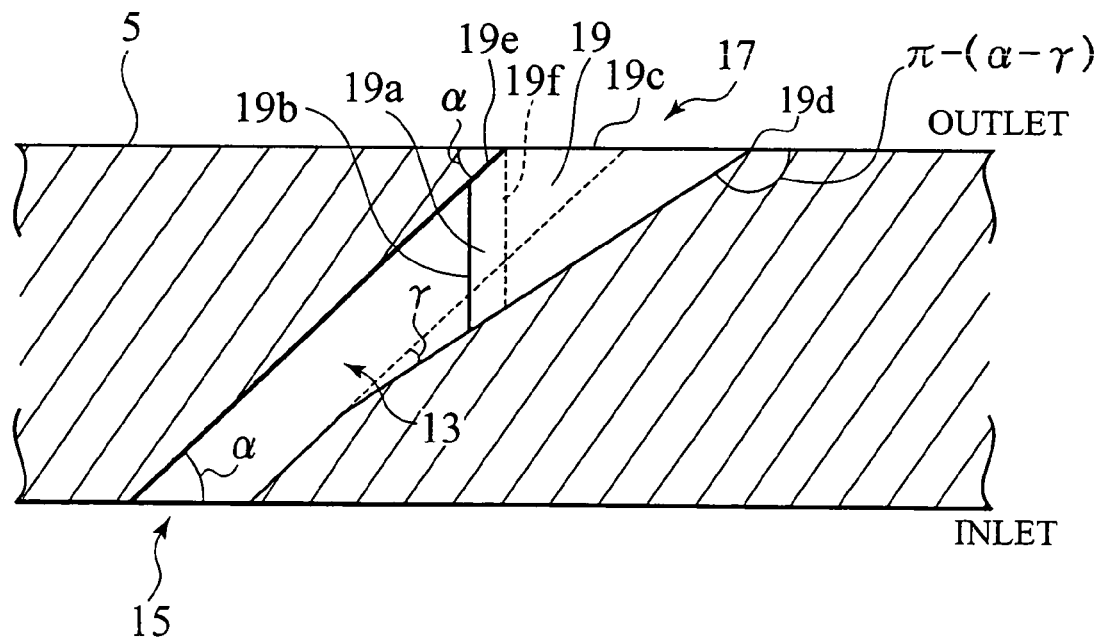
FIG. 3 is a cross-sectional view along with the line III—III of FIG. 2.

As shown in FIGS. 1 to 3, the film cooling holes 13 are provided on the profile of the alar part 5 by electric discharging, and each film cooling hole 13 is connected with the cooling passage 11. Each film cooling hole 13 includes an inlet opening 15 which is formed in the inside of the alar part 5 for introducing the cooling air CA. It includes a wedge-shaped spurt out opening 17 which is formed on the outside of the alar part 5 so that the cooling air spurts out. Additionally, each cooling hole 17 is slanted so that the cooling air CA spurts out along the external surface of the alar part 5. That is, as shown in FIG. 3, the opening 15 is slanted to the inlet surface of the alar part 5 in $\alpha$, and the opening 17 is slanted to the outlet surface of the alar part 5 in $\alpha$ and $[\pi-(\gamma-\alpha)]$ accordingly.

With reference to FIG. 2, a partition wall 19 is provided with the bottom surface of the outlet side of the film cooling hole 13. The partition wall 19 is extended in orthogonal direction to the expansion direction (longitudinal direction in FIG. 2) of the spurt out opening 17, and the partition wall 19 (a center C) divides the spurt out opening 17 into a divided opening 17a, 17b. That is, the cooling air CA is introduced through one opening 15 and blows out from two spurt out openings 17a, 17b accordingly.

As shown in FIG. 3, the partition wall 19 is formed in a quadrangular-shape which is constituted of an outer face 19c, a pair of side walls 19e, 19d and an inside wall 19d. Furthermore, the opening 17a (17b) is a diffuser type passage, which is extended to the outlet side from the inlet side of the alar part 5 by an angle $\gamma$. Meanwhile, the outer face 19c is made flush with the surface of the alar part 5.

With reference to FIGS. 2 to 3, viewed from the side opposite to the spurt out opening 17, a portion 19a is defined by the inside wall 19b and a dotted line 19f, and is extended from the spurt out opening 17 to the inlet opening 15.

The working of the embodiment of the present invention will be described below.

While operating the gas turbine engine, the compressor or the fan feeds the compressed air to the cooling passage 11, whereafter the cooling air CA is introduced to the film cooling hole 13 of the alar part 5 from the inlet opening 15, and thereafter the cooling air CA spurts out from the opening 17 (17a, 18b) to coat the surface of the alar part 5. As shown in FIG. 5, the cooling air CA flows along the surface of the alar part 5 thereby forming a cooling film CF which coats and protects the surface of the alar part 5. According to this structure, the cooling turbine rotor blade 1 can be cooled with the film cooling as well as the convection cooling which cools inside the blade body 3 (cooling function in the cooling turbine rotor blade 1).

Additionally, as shown in FIG. 2, viewed from the side opposite to the spurt out opening 17, the portion 19a of the partition wall 19 is extended to the back side of the film cooling hole 13, and therefore it suppresses the separation phenomenon of the cooling air CA occurring around the outlet of the film cooling hole 13 (spurt out opening 17), and the expansion angle $\theta$ can be set larger than that of the conventional one corresponding to the amount of the expansion length L of the portion 19a.

According to the embodiment of the present invention, the wedge shaped opening 17 can blow out large amount of the cooling air CA for forming the cooling film CF in comparison with the conventional diffuser type opening.

With the wedge shaped opening 17, it is possible to reduce the number of the cooling holes 13 necessary for forming the cooling film CF which coats throughout the peripheral of the alar part 5. Therefore, it is possible to manufacture the cooled turbine blade 1 in a short time, thereby saving on the cost of manufacturing the cooled turbine rotor blade 1, and improving the efficiency of the turbine engine by reducing the quantity of the cooling air CA consumed.

Meanwhile, the present invention is not limited to the embodiment described above, thus the modified embodiments which described below are also within the scope of the present invention.

That is, each film cooling hole 13 may have the two partition walls 19. Furthermore, the film cooling hole 13 and/or the partition wall 19 can maybe be configured as components, such as an alar part, an inner-band, and an outer-band, equipped in a cooled turbine stationary blade or a turbine-shroud.

What is claimed is:

1. Cooled turbine component for film cooling in a gas turbine engine comprising:
    a main body;
    a film cooling hole which is formed in the main body, and the hole further includes an inlet opening which is provided on an inlet side surface of the main body and an spurt out opening which is provided on an outlet side surface of the main body, and compressed air which is bled from a compressor or a fan introduces to the cooling hole from the inlet opening for providing cooling air, and the cooling air spurt out from the spurt out opening, and the cooling hole is slanted to the thickness direction of the component body so that the cooling air form a cooling film which coats and protects the surface of the main body; and
    a partition wall which is provided on the bottom surface of the outlet side of the film cooling hole, and the partition wall is extended from the outlet side of the cooling hole to the inlet side of the cooling hole being viewed from the side opposing to the spurt out opening.

2. The cooling turbine component of claim 1, wherein the partition wall is at right angle to the expansion direction of the spurt out opening, and the partition wall divides the spurt out opening.

3. The cooling turbine component of claim 2, wherein the partition wall divides the spurt out opening into at least two spurt out openings.

4. Cooled turbine blade for film cooling in a gas turbine engine comprising:
    a blade body including a cooling passage which is provided inside the blade body, and some part of compressed air which is bled from a compressor or a fan equipped with the gas turbine engine is flowed in the passage;
    a film cooling hole which is provided on the surface of the blade body to communicate with the cooling passage, and the film cooling has an inlet opening which is formed on the inlet side of the blade body and at least one pair of wedge shaped spurt out opening which are formed on the outlet side of the blade body, the cooling air passes to the outlet opening from the inlet opening, and the hole is slanted to the thickness direction of the blade body so that the cooling air uniformly flows across the surface of the blade body; and a partition wall which is provided on the outlet side of a bottom wall of the film cooling hole, and the wall is extended to the inlet side from the outlet side of the blade body being viewed from the side opposite to the spurt out opening.

5. The cooled turbine blade of claim 4, wherein the partition wall is at right angle to the expansion direction of the spurt out opening, and the partition wall divides the spurt out opening.

6. The cooled turbine blade of claim 5, wherein the partition wall divides the spurt out opening into at least two spurt out openings.

\* \* \* \* \*